US009517849B2

(12) United States Patent
Zehnder et al.

(10) Patent No.: US 9,517,849 B2
(45) Date of Patent: Dec. 13, 2016

(54) HANDHELD DOSAGE-DISPENSING INSTRUMENT FOR POWDEROUS OR PASTEOUS DOSAGE MATERIAL

(71) Applicant: Mettler-Toledo AG, Greifensee (CH)

(72) Inventors: Marc Zehnder, Zürich (CH); Bruno Nufer, Illnau (CH); Siegfried Zeiss, Wolfhausen (CH)

(73) Assignee: Mettler-Toledo GmbH, Greifensee (CH)

( * ) Notice: Subject to any disclaimer, the term of this patent is extended or adjusted under 35 U.S.C. 154(b) by 54 days.

(21) Appl. No.: 14/329,143

(22) Filed: Jul. 11, 2014

(65) Prior Publication Data

US 2015/0021364 A1    Jan. 22, 2015

(30) Foreign Application Priority Data

Jul. 19, 2013  (EP) .................... 13177278

(51) Int. Cl.
*G01F 11/00*   (2006.01)
*B65B 1/36*    (2006.01)
*B65B 1/06*    (2006.01)
*G01F 13/00*   (2006.01)
*G01G 17/06*   (2006.01)

(52) U.S. Cl.
CPC . *B65B 1/36* (2013.01); *B65B 1/06* (2013.01); *G01F 13/001* (2013.01); *G01G 17/06* (2013.01)

(58) Field of Classification Search
CPC ..... B01L 3/0224; B01L 3/0227; B01L 3/0279; B01L 2200/087; B05B 11/3059; B05B 11/3091; B05B 11/3092; G01F 13/001; G01G 17/06

USPC .......... 222/287, 309, 504, 509, 192, 150.01, 222/153.01; 73/864.14
See application file for complete search history.

(56) References Cited

U.S. PATENT DOCUMENTS 2,925,102 A *  2/1960  Cummings ............ A23G 9/288
                                                    141/263
4,363,429 A * 12/1982  Schindler ............. B65B 39/004
                                                    222/504
4,519,258 A *  5/1985  Jakubowicz .......... B01L 3/0227
                                                    128/DIG. 1
5,228,604 A *  7/1993  Zanini .................... B67C 3/281
                                                    222/504

(Continued)

FOREIGN PATENT DOCUMENTS

EP        0496784 B1    4/1994
WO       95/18365 A1    7/1995

*Primary Examiner* — Paul R Durand
*Assistant Examiner* — Charles P Cheyney
(74) *Attorney, Agent, or Firm* — Standley Law Group LLP

(57) ABSTRACT

An instrument (1) for powderous or pasteous substances has a control unit (40) and a dispensing unit (50). The control unit is configured as a grip handle to be handheld. The dispensing unit is designed for removable seating in the holder device. A vertically movable shutter bolt (52) can open a discharge orifice (58). The control unit (40) has an actuator (20) directed at the shutter bolt, with a motor (21), a transmission (22), an actuator element (30) and a drive shaft (12), oriented vertically when operated. The drive shaft (12) can be engaged with the shutter bolt. Continuing and increased actuation of the actuator element moves the shutter bolt into an opening range where the shutter bolt opens up the discharge orifice to a variable, position-dependent extent, allowing the material to flow into a target vessel.

16 Claims, 3 Drawing Sheets

(56) References Cited

U.S. PATENT DOCUMENTS

| | | | | |
|---|---|---|---|---|
| 5,389,341 | A | * | 2/1995 | Tuunanen ............. B01L 3/0227 422/509 |
| 5,505,097 | A | * | 4/1996 | Suovaniemi .......... B01L 3/0227 73/864.18 |
| 5,785,761 | A | * | 7/1998 | Suzuki .................. B05B 1/3006 118/612 |
| 5,983,733 | A | | 11/1999 | Strandberg et al. |
| 6,253,972 | B1 | * | 7/2001 | DeVito ................. B05C 5/0225 222/504 |
| 7,416,704 | B2 | | 8/2008 | Scordato et al. |
| 7,770,475 | B2 | | 8/2010 | Magnussen et al. |
| 8,191,587 | B2 | | 6/2012 | Luechinger et al. |
| 8,245,883 | B2 | | 8/2012 | Luechinger et al. |
| 8,267,279 | B2 | | 9/2012 | Luechinger et al. |
| 2002/0020233 | A1 | * | 2/2002 | Baba ..................... B01L 3/0217 73/864.16 |
| 2003/0099578 | A1 | * | 5/2003 | Cote .................... B01L 3/0224 422/525 |
| 2010/0294810 | A1 | * | 11/2010 | Ikushima ............ B05C 11/1034 222/309 |
| 2013/0126041 | A1 | * | 5/2013 | Bailey ....................... B65B 1/06 141/83 |

\* cited by examiner

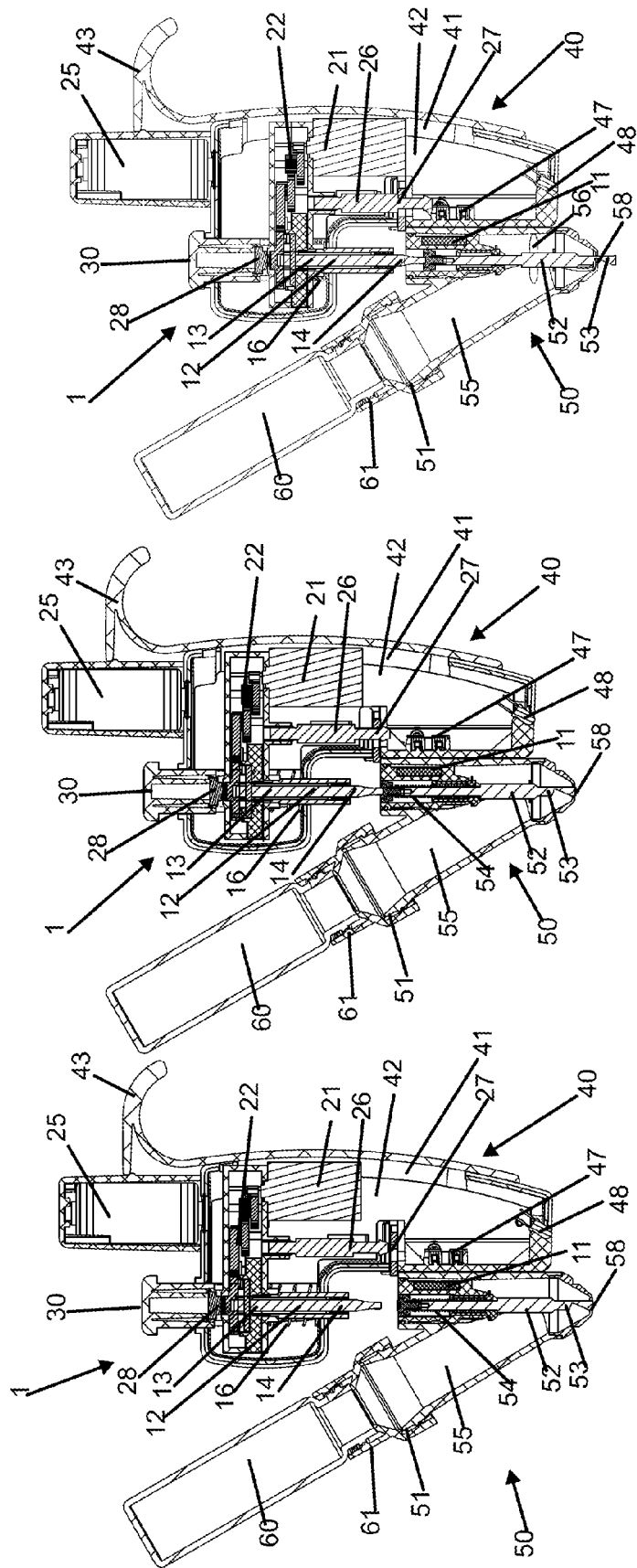

HANDHELD DOSAGE-DISPENSING INSTRUMENT FOR POWDEROUS OR PASTEOUS DOSAGE MATERIAL

CROSS-REFERENCE TO RELATED APPLICATIONS

This application is entitled to benefit of a right of priority under 35 USC §119 from European patent application 13177278.2, filed on 19 Jul. 2013, the content of which is incorporated by reference as if fully recited herein.

TECHNICAL FIELD

The invention concerns a handheld dosage-dispensing instrument for free-flowing substances, specifically powders and pastes with complex rheological properties.

BACKGROUND

Dosage-dispensing instruments are generally used for the purpose of dispensing exactly measured small quantities of critical, for example toxic, substances into a target vessel. In many cases the target vessel is placed on a balance, whereby the weight of the dispensed substance can be monitored during the dispensing process and the further discharge of substance into the target vessel can be stopped as soon as a specified target weight has been reached.

Instruments of the current state of the art such as for example the dosage-dispensing device described in commonly-owned EP 1930702 A1 (also available as U.S. Pat. No. 8,245,883) are designed as stationary devices which, in their operating state, are set up on a work surface. These stationary dosage-dispensing devices are characterized in general by a two-part design structure with a dispensing unit and a control unit. The dispensing unit, which contains a supply of the substance to be measured out, includes in particular a dispensing head with a discharge orifice and with means for opening and closing the discharge orifice as well as, in certain cases, for propelling and loosening the powderous or pasteous dosage material. As a further component of the dispensing unit, a source container can be connected to the dispensing head as a way of enlarging the supply volume. The control unit in the dosage-dispensing device of EP 1930702 A1 is a stationary base- or console unit which is designed so that a dispensing unit can easily be set in place as well as removed and exchanged for another dispensing unit.

In the operating state, the discharge orifice of the installed dispensing unit is directed downward, and the means for opening and closing the discharge orifice as well as, in certain cases, for propelling and loosening the powderous or pasteous dosage material are in releasable engagement with propulsion- or actuation elements that are part of the control unit. The dispensing unit in its installed state in the control unit is arranged in a laterally projecting part of the control unit, so as to provide space for a balance below the dispensing unit. For further details, the reader is referred to the European patent application EP 1930702 A1, whose disclosure content in its entirety is hereby incorporated by reference in the present description.

In the dosage-dispensing device described in EP 1930702 A1, the functions of advancing and loosening the powderous or pasteous dosage material are performed through the stirring action of a stirring mechanism in the dispensing head and, in certain cases, a second stirring mechanism in the source container. A further dosage-dispensing device, which is described in commonly-owned EP 1959244 B1 (also available as U.S. Pat. No. 8,191,587), shows the same design structure with a control unit on which an exchangeable dispensing unit is installed. However, the functions of propelling and loosening the dosage material are in this case achieved by imparting shocks to the dispensing unit. The control unit is equipped for this purpose with an impact mechanism, i.e. in essence a hammer mechanism. This solution proves to be particularly advantageous for certain powderous dosage materials such as for example corn starch, which would be compacted by stirring instead of being loosened, so that the flow of material through the dispensing head would be blocked and, as a consequence, no material could be discharged from the dispensing head even with the discharge orifice fully opened. For further details of this dosage-dispensing device with an impact mechanism, the reader is referred to the European patent EP 1959244 B2, whose disclosure content in its entirety is hereby incorporated by reference in the present description.

The stationary dosage-dispensing devices of the foregoing description, which are designed for powderous or pasteous dosage material, are best suited for use at a dosage-dispensing work station that is permanently or temporarily dedicated to this purpose, where a dosage-dispensing device and a balance are set up together and connected either directly or through a computer, so that they work together in a closed feedback loop. However, if the dosage-dispensing applications are of a variable or sporadic nature or are performed with different balances, a permanently set-up dosage-dispensing work station proves impractical. Consequently, there is a need for a portable dosage-dispensing instrument which the user—in order to perform a dispensing process—can hold with one hand above a target vessel that is sitting on a balance, allowing the user to simultaneously monitor the weight display of the balance and to manually regulate the discharge rate of the dosage material and stop the discharge when the specified target weight has been reached.

The idea of using the aforementioned dosage-dispensing devices of EP 1930702 A1 and EP 1959244 B1 directly as handheld dosage-dispensing instruments has been considered, but they proved to be absolutely unsuitable for this application, particularly from an ergonomics point of view. It is hardly possible to hold these devices securely by hand over a target vessel that is sitting on a balance and to simultaneously monitor the weight display of the balance and manually regulate the discharge of the dosage material.

On the other hand, there are numerous state-of-the-art handheld instruments available for the dispensing of fluids, which are commonly referred to as pipettes or handheld pipettes. Of particular interest in the present context are the so-called piston pipettes, among which the pipettes described in EP 1015110 B1 and EP 0496784 B1 may be named as typical examples. Piston pipettes operate according to the displacement principle, meaning that when a movable piston is pushed down, it displaces the air column ahead of it, and when the piston is retracted, it pulls the air column with it, whereby also the liquid that is to be measured is, respectively, pushed out of, or pulled into, the pipette tip which is seated at the end of the pipette. This pipette tip is a disposable article made of plastic. It is the only part that comes into contact with the liquid.

The manual/electronic hybrid pipette described in US 2010/0199789 A1 is likewise a piston pipette, but it differs from the preceding examples in that electronic means with measurement-, calibration- and compensation functions are incorporated directly in the instrument.

The piston pipettes of the foregoing description are of an essentially rod-shaped configuration, wherein the thumb-operated spring-biased plunger knob of the piston is arranged at one axial end of the rod and the pipette tip is arranged at the other end. In the vertical or slightly inclined working position of the pipette, the user's hand grasps the upper part of the rod which is ergonomically designed as a grip handle, so that the thumb rests on the plunger knob.

Obviously, these piston pipettes which serve to dispense liquids are totally unsuitable for powderous or pasteous substances, as these kinds of substances cannot be aspirated into or expelled from the pipette tip with the displacement principle that has been explained above. Furthermore, with the functionally dictated arrangement of the grip handle at the far end from the discharge opening, it is difficult to hold the discharge opening securely and accurately over a target vessel which is in most cases relatively small, particularly while monitoring the weight display of a balance at the same time.

A configuration of a piston pipette that deviates from the customary rod-shaped arrangement is shown in U.S. Pat. No. 7,416,704 B2. A base unit in the shape and size of a grip handle likewise carries at its upper end the thumb-operated plunger knob for the actuation of the piston. However instead of extending downwards in the shape of a rod with a discharge opening at the lower end, the bottom of the base unit is configured as a flat supporting stand, while the discharge opening, on which the disposable pipette tip is placed, is located at the end of a spout which projects at a downward angle from the side of the base unit. The arrangement of the discharge opening on a lateral spout has the advantage that the discharge opening can be held securely and accurately over a target vessel during the dispensing process. However, as in the preceding examples the use of this pipette is limited to the dispensing of liquids.

A handheld dosage-dispensing instrument that is referred to as a "powder pipette" is presented in WO 95/18365. Although this device does not operate according to the piston principle, it has a rod-shaped configuration like the three first examples, wherein one end of the rod is designed as a grip handle with a thumb-operated actuator knob at the end, while the opposite end of the rod contains the discharge opening. The handheld dosage-dispensing instrument is supplied with powder through a lateral opening while the discharge opening is in its closed state. By pushing down on the thumb-operated actuator knob, the shutter mechanism which is designed as a spreader element is opened and simultaneously set into rotation, whereby the dosage material is discharged from the dosage-dispensing instrument.

This dosage-dispensing instrument likewise has the aforementioned disadvantage of a rod-shaped arrangement. A further drawback lies in the fact that the powderous substance that is to be dispensed is obtained from an open container, whereby the outside of the instrument could be contaminated with dosage material. If different substances need to be dispensed, it is almost impossible to reliably clean the interior of the instrument, which presents a problem particularly with substances that are toxic or otherwise critical.

The foregoing examples lead to the conclusion that the aforementioned need for a handheld dosage-dispensing instrument for powderous or pasteous substances is not met by the available state of the art. It is therefore the object of the present invention to create a handheld dosage-dispensing instrument for powderous or pasteous substances which has the capability to perform all of the functions of the above-described stationary dosage-dispensing devices according to EP 1930702 A1 and EP 1959244 B1, with a basic design structure analogous to the dosage-dispensing devices named in these references, i.e. having a control unit and a dispensing unit which can be interchangeably installed in the control unit, but which is distinguished from these stationary devices by a compact, portable design configuration.

SUMMARY

This task is solved by a handheld dosage-dispensing instrument with the features according to the independent main claim 1. Further variations and embodiments of the subject of the invention are presented in the subordinate claims.

A handheld dosage-dispensing instrument for powderous or pasteous substances includes a control unit that is configured as a grip handle with an elongated body partially enveloped by an enclosure shell and with a holder device, and further includes at least one dispensing unit designed to be seated in the holder device as well as to be removed from the latter, wherein the dispensing unit has a vertically movable shutter bolt with a shutter element as well as a discharge orifice which can be closed by the shutter element. The control unit contains at least one actuator whose action is directed at the dispensing unit seated in the holder device, with a motor and a transmission, a manually operable actuator element, and a drive shaft which in the operating position of the instrument has an essentially vertical orientation and which can be driven by the motor by way of the transmission, wherein the drive shaft has a first end facing towards the actuator element and a second facing towards the shutter bolt of the installed dispensing unit, wherein through manually controlled movement of the actuator element the drive shaft can be brought from a home position into an engaged position in which the second end is mechanically engaged in the shutter bolt, and wherein through further manually controlled movement of the actuator element past the point of engagement the shutter bolt can be brought into an opening range where the shutter element opens up the discharge orifice to a variable, position-dependent extent. In relation to the operating position of the handheld dosage-dispensing instrument, the drive shaft is arranged in a laterally projecting part of the body. The interior of the body contains a hollow space in which at least major portions of the motor and the transmission are enclosed. The motor can be switched on and off advantageously by a manual force directed at the actuator element.

Preferably, the motor is supplied with energy from a battery that is arranged above the motor. It is particularly advantageous if the battery can be removed and replaced without tools. Instead of a disposable battery, it is also possible to use a rechargeable power source.

In a preferred embodiment, the motor, the transmission and the drive shaft form an integrally connected actuator unit which is supported in the body with vertical mobility relative to the operating position of the instrument, connected to the actuator element and movable through a manual force directed at the latter. The transmission of the actuator unit is preferably a spur gear arrangement wherein the axes of rotation of the gears have a substantially vertical orientation relative to the operating position of the handheld dosage-dispensing instrument.

The essentially vertical displacement of the actuator unit from the home position to the engagement position and further into the opening range takes place preferably against the resistance of a first return spring which is braced against the control unit and which in response to a decrease of the manual force on the actuator element pushes the actuator unit back towards the home position.

When the shutter bolt is engaged by the drive shaft, its vertical displacement from the engagement position into the opening range is preferably opposed by the additional resistance of a second return spring which is braced against the dispensing unit and which pushes the shutter bolt axially upward against the drive shaft.

The actuator unit preferably includes a retainer element which, upon reaching the engagement position, snaps into a locking element so that a return of the actuator unit towards the home position is blocked, but continued travel into the opening range is not impeded. For the release of the lock, at least one unlocking element which can be operated with a finger is arranged on the outside of the control unit.

When the second end of the drive shaft, which is driven by the motor by way of the transmission, enters into engagement with the shutter bolt, the latter is set into rotation. In an advantageous arrangement, the actuator unit further includes a knocking device which is connected to the drive shaft and likewise driven by the motor by way of the transmission, whereby a quick, short-stroke knocking movement in the direction of the rotary axis of the drive shaft can be superimposed on the rotation of the latter. The knocking movement of the drive shaft which is superimposed on the rotary movement is transmitted from the drive shaft to the shutter bolt through the axially directed compressive engagement force.

In a preferred embodiment, a stirrer element is solidly connected to the shutter bolt, so that the dosage material can be loosened up by the rotation and the simultaneous knocking movement which are generated by the actuator and transmitted from the drive shaft to the shutter bolt.

Further, there can be a means of identification, for example an RFID transponder, arranged on the dispensing unit, specifically on the dispensing head, on which data are stored concerning the dosage material contained inside the dispensing unit. As a practical feature, the control unit includes a suitable read/write device which is equipped for example for wireless data communication with a computer. Thus, the data stored on the means of identification can on the one hand be read and transmitted to the computer, and conversely, data generated by the computer and transmitted to the read/write device can be stored on the means of identification.

In an advantageous embodiment of the handheld dosage-dispensing instrument of the invention a projection resembling a nose is formed at the upper end (relative to the operating position) of the shell that envelops the grip handle. In the operating state, this projection rests on the index finger of the hand grasping the body of the control unit, assuring a secure grip on the handheld dosage-dispensing instrument.

A time sequence of operations in the dispensing of powderous dosage material with a handheld dosage-dispensing instrument according to the invention can be described as follows:

In a first phase, a dispensing unit containing the dosage material is set into the control unit of the handheld dosage-dispensing instrument which is in its home position. The dispensing unit is secured in the holder device by a self-locking latch.

In a second phase, the handheld dosage-dispensing instrument, in vertical orientation with the discharge orifice facing downward, is held over a target area, specifically over a target vessel that has been placed on a balance.

In a third phase, thumb pressure is applied to the actuator element with the immediate result that the contact switch is closed, whereby the rotary movement of the drive shaft is started.

In a fourth phase, the actuator element is pushed downward by continued and increased thumb pressure, whereby the drive shaft is moved into the engagement position where, due to the already running rotary movement, the lower end of the drive shaft automatically finds its engagement with the shutter bolt of the installed dispensing unit. Simultaneously, at the point of full engagement, a latch mechanism locks up, which prevents retraction of the drive shaft from the engaged position. Thus, when the thumb pressure is removed, the engagement continues to be maintained, but the contact switch is opened, whereby the rotary movement is stopped.

In a fifth phase, through continued and further increased thumb pressure on the actuator element, the shutter bolt is moved into the opening range, and as a result of the opposing force of the second return spring which is transmitted by the shutter bolt to the drive shaft, a vertical knocking movement of the drive shaft which is superimposed on the rotation is activated, while the shutter element opens up the discharge orifice to a variable degree of aperture which is controllable be thumb pressure, so that the dosage material that has been loosened by the rotary and knocking movements can flow through the discharge orifice into the target vessel. By letting up on the thumb pressure the discharge opening is reduced or closed up, and if the thumb pressure is taken off entirely the motor is switched off while the drive shaft remains in the engaged position.

After the dispensing process has been completed the handheld dosage-dispensing instrument, which continues to remain in the engaged position, can be used for further dispensing cycles with the same dispensing unit. In order to remove and exchange the dispensing unit, the lock on the engagement position is released by actuating the at least one unlocking element, so that the first return spring can push the drive shaft and the actuator element back into the home position and the dispensing unit can be unlatched from the holder device.

The lower end of the body of the control unit in its operating position is facing towards the target vessel. An illumination element is arranged at this lower end. The brightness of the illumination element depends on the operating state of the handheld dosage-dispensing instrument. If the handheld dosage-dispensing instrument is not ready for operation, the illumination element is switch off. When the instrument is ready for a dispensing process, the illumination element is lit at a first level of brightness. During the dispensing process, the illumination element is lit to a second brightness level. The second brightness level is selected so that the target vessel is well lit, allowing the operator to visually monitor the dispensing process. The first brightness level is lower than the second brightness level. For the handheld dosage-dispensing instrument to be ready for a dispensing process, the dispensing unit has to be correctly installed in the control unit.

BRIEF DESCRIPTION OF THE DRAWINGS

Details of the handheld dosage-dispensing instrument will be apparent from the description of the examples illustrated in the drawings, wherein:

FIG. 2 shows the handheld dosage-dispensing instrument of the invention with a dispensing unit installed, in home position FIG. 3 shows the handheld dosage-dispensing instrument of the invention with a dispensing unit installed, in engagement position;

FIG. 4 shows the handheld dosage-dispensing instrument of the invention with a dispensing unit installed, in maximum opening position;

DETAILED DESCRIPTION

Figure 1:
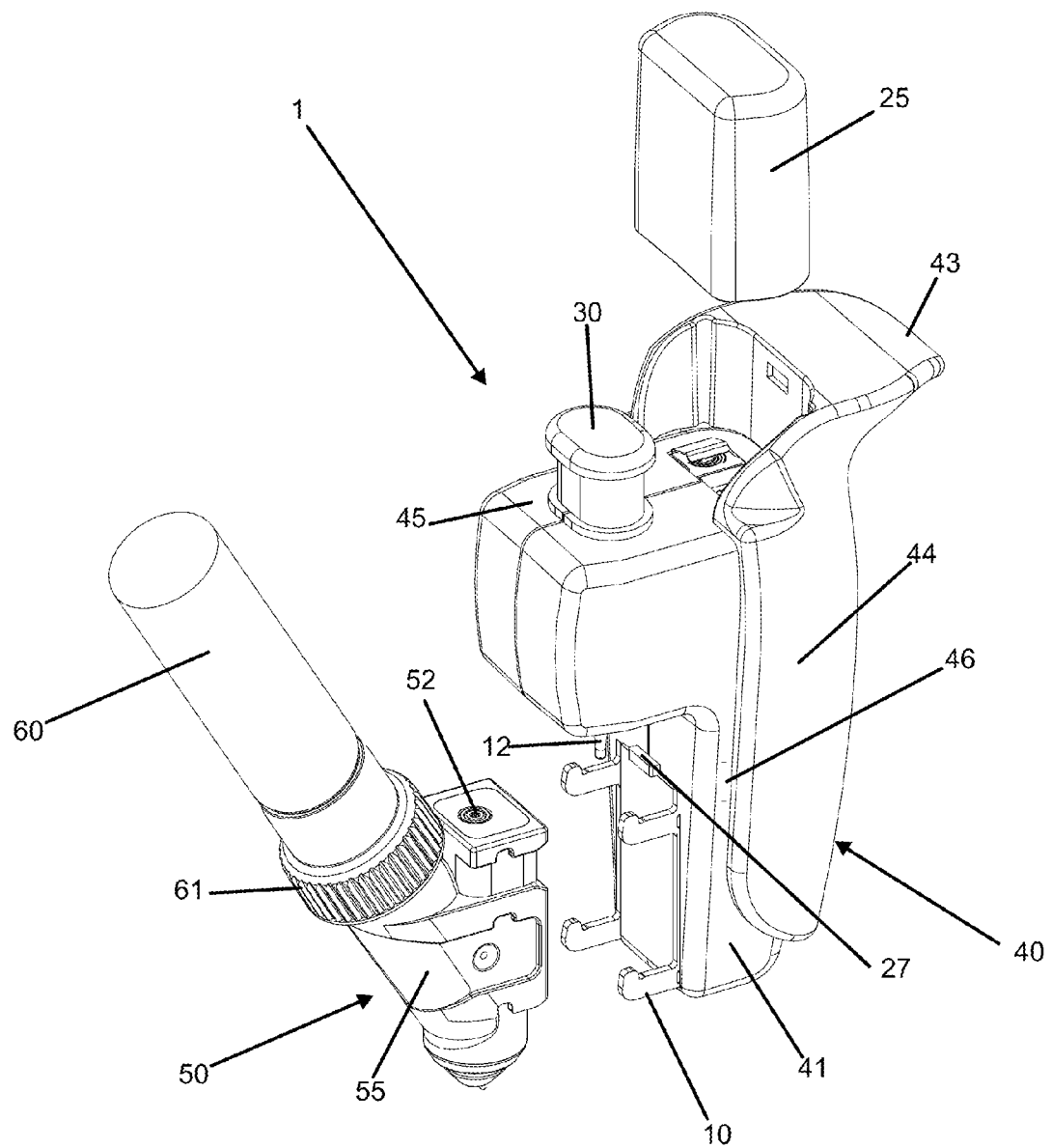
FIG. 1 represents an exploded view of the handheld dosage-dispensing instrument of the invention

FIG. 1 illustrates a preferred embodiment of the handheld dosage-dispensing instrument 1 of the invention in an exploded view, showing the dispensing unit 50 and the control unit 40 as well as the battery 25. The dispensing unit 50 is essentially composed of the dispensing head 55 and the source container 60 which are connected to each other by an adapter 61. With smaller quantities of dosage material, the dispensing head 55 by itself is large enough to hold the substance that is to be dispensed. The source container 60 is not needed in this case, and the dispensing head 55 can instead be closed up with an appropriate capping element (not shown). In addition, the upward-facing end of the shutter bolt 52 can be seen at the top of the dispensing head 55.

The control unit 40 is shown in the position in which it could be grasped with the right hand. The exterior design of the control unit is symmetrical, so that it can be used by right-handers as well as left-handers. Details shown in the drawing include the body 41 with the grip-handle shell 44 and the holder device 10 into which the dispensing head 55 can be seated. The actuator element 30 can be seen protruding from the top and the drive shaft 12 protruding out of the bottom of a laterally projecting part 45 of the body 41. At the upper end of the grip-handle shell 44, a nose-like projection 43 is formed which during operation rests on the hand that is grasping the grip-handle shell 44 and thus ensures a safe grip on the handheld dosage-dispensing instrument 1. The drawing further shows one of the two unlocking elements 46 which are arranged symmetrically opposite each other near the border of the grip-handle shell 44. In the operation of the handheld dosage-dispensing instrument 1, the actuator element 30 is moved by thumb action, and the respective unlocking element 46 for right- or left-handed operation is operated for example with the ring finger of the hand that encloses the grip-handle shell 44.

When in operating position, the lower end of the body 41 faces towards the target vessel. Arranged at this lower end is an illumination element 48. The primary function of this illumination element 48 is to illuminate the target vessel during the dispensing process. Furthermore, the illumination element 48 can be used to indicate the operating state through different levels of light intensity.

In the illustrated preferred embodiment of the handheld dosage-dispensing instrument, the battery 25 is configured as a replaceable unit that is accessible from the outside and can be inserted from above.

The interior layout and the functional operating sequence of the handheld dosage-dispensing instrument 1 will now be explained by referring to FIGS. 2 to 4 which show the handheld dosage-dispensing instrument 1 with a dispensing unit 50 seated in place in a cross-sectional representation, wherein FIG. 2 illustrates the home position, FIG. 3 the engagement position, and FIG. 4 the maximum opening position. Arranged in the upper part of the hollow space 42 inside the body 41 is the actuator unit 20 (see FIG. 5), which includes the motor 21, the transmission 22 and the drive shaft 12, and which is vertically movable and is held in the home position by the pre-tensioned return spring 16, a compressive helix spring surrounding the drive shaft. An actuator element 30, which is concentric with the drive shaft 12 and protrudes upward through a passage opening of the body 41, is connected to the actuator unit 20 by way of a push-contact switch 28 in such a way that the contact switch is closed when a slight amount of pressure is applied to the actuator element 30. This will start the motor 21, putting the drive shaft 12 into rotation by way of the transmission 22, as will be explained in detail below in the context of FIGS. 5 and 6. As long as the contact switch 28 remains closed by keeping pressure on the actuator element 30, the rotary movement is maintained. When the pressure is taken off, the rotation stops immediately. Under a continued and increased manual pressure on the actuator element 30, the actuator unit 20 with the drive shaft 12 is moved downward against the resistance of the first return spring 16 into the engagement position which is shown in FIG. 3, where due to the already running rotary movement, the lower end 14 of the drive shaft 12 automatically finds its engagement with the shutter bolt 52 of the installed dispensing unit 50.

A bolt-shaped retaining element 26 which is solidly connected to the actuator unit 20 extends downward from the actuator unit 20 towards a locking element 27 which is solidly connected to the body 41. Upon arrival at the full engagement position, the locking element 27 snaps into a catch on the bolt-shaped retaining element 26, thus blocking on the one hand upward movement of the actuator unit 20 and thus a retraction of the drive shaft 12 from the engagement with the shutter bolt 12 even when the pressure on the actuator element 30 is taken off, while on the other hand still allowing a further downward movement of the actuator unit 20 with the drive shaft 12. As long as the drive shaft 12 remains in engagement with the shutter bolt 52 of the installed dispensing unit 50, the latter cannot be separated again from the control unit 40.

For a further downward movement from the engagement position, it is necessary to overcome the biasing force of the second return spring 54 of the shutter bolt 52. This has the result, as will be explained below in the context of FIGS. 5 and 6, that in response to the opposing force exerted by the shutter bolt 52 against the drive shaft 12 an additional axial knocking movement of the drive shaft 12 is activated.

FIG. 4 shows the handheld dosage-dispensing instrument 1 with installed dispensing unit 50 in the maximally opened position, where the shutter element 53 protrudes downward out of the discharge orifice 58, leaving part of the aperture cross-section free, so that the dosage material which has been loosened by the rotation and the knocking action is discharged, i.e. dispensed through the discharge orifice. The loosening effect of the rotary movement and knocking action may be enhanced by a stirrer element 56 which is arranged on the shutter bolt 52. When the shutter bolt 52 is in the maximally opened position, the actuator element is sitting against the housing of the body 41, whereby the axial displacement range of the drive shaft 12 and, consequently, of the shutter bolt 52 is limited in the downward direction. As mentioned above, the displacement of the shutter bolt 52 from the engagement position of FIG. 3 through an opening range ending at the maximally opened position of FIG. 4 takes place against the additional resistance of the second return spring 54, which is braced against the dispensing head 55 and urges the shutter bolt 52 upward against the drive shaft 12, whereby the shutter bolt 52 is kept engaged with the drive shaft 12. By changing the thumb pressure on the actuator element 30, the vertical position of the shutter element 53 and thus of the freed-up portion of the aperture cross-section of the discharge orifice is varied, whereby the flow of dosage material from the discharge orifice 58 can be controlled and stopped, when a specified dosage quantity has been reached.

When the thumb pressure is completely removed, the motor 21 is switched off, but the drive shaft 12 continues to stay engaged with the shutter bolt 52, as has been explained above in the context of FIG. 3, so that the dosage-dispensing unit 50 cannot be separated from the control unit 40. In this state, the handheld dosage-dispensing instrument 1 can be used for further dispensing cycles with the same substance, if there is a sufficient supply in the dispensing unit 50. In order to take off or exchange the dispensing unit 50, the operator pushes one of the aforementioned unlocking elements 46 (see FIG. 1), whereby the locking element 27 is unlatched from the bolt-shaped retaining element 26, so that the actuator unit 20 together with the drive shaft 12 and the actuator element 30 are pushed back into the home position (see FIG. 2) by the pressure force of the return spring 16, and the dispensing unit 50 can be taken out of its seat in the holder device 10 of the control unit 40.

Figure 5:
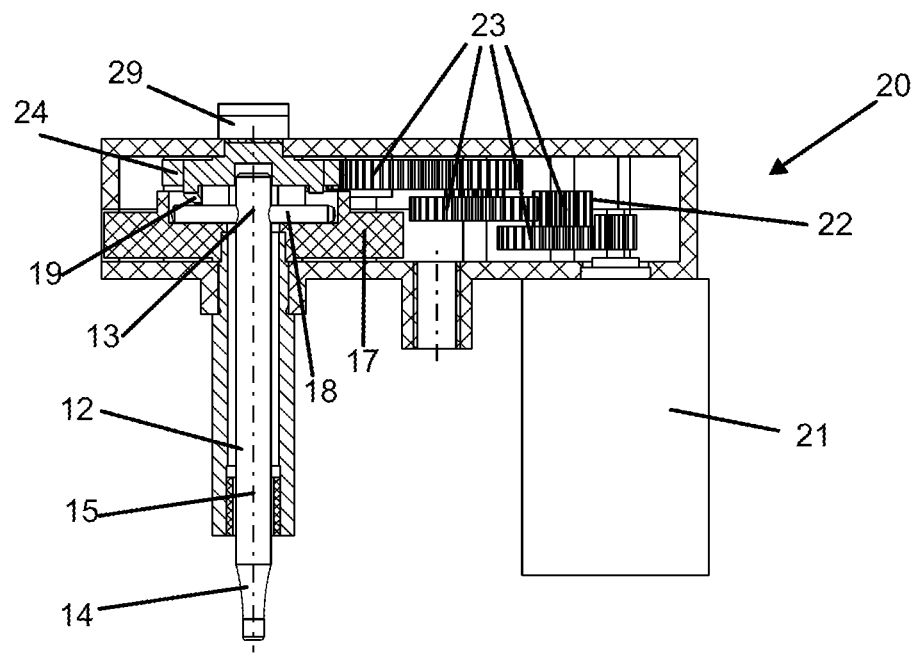
FIG. 5 represents a cross-sectional side elevation of the actuator unit.
Figure 6:
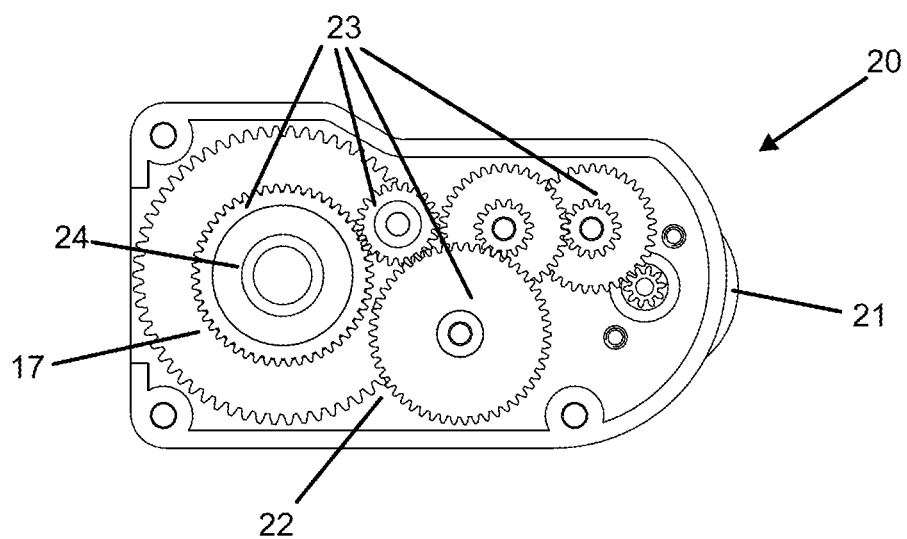
FIG. 6 shows the opened actuator unit with the view directed from above at the transmission.

FIG. 5 shows the actuator unit 20 with the motor 21, transmission 22 and drive shaft 12 in cross-section in a lateral view, and FIG. 6 shows the interior of the same actuator unit 20 with the view directed from above. Among the details of FIG. 5, arranged on top of the actuator unit is the fastening element 29 for the pressure contact switch 28 on which the actuator element 30 is seated (see FIGS. 1 to 4), so that the power supply of the motor 21 is switched on by exerting a pressure force on the actuator element 30, and switched off by removing the pressure force. The motor 21, by way of interposed gears 23, drives on the one hand the output gear 17 and on the other hand the knocker wheel 24 at different rpm-rates. The drive shaft 12 carries a transverse driving pin 18 which is arranged in a corresponding recess of the output gear 17, whereby the drive shaft 12 is rotationally coupled to the output gear 17, but remains axially movable relative to the latter. In the state shown in FIG. 5, where no axial force is transmitted from the drive shaft 12 to the shutter bolt 52 of an installed dispensing unit 50, the drive shaft with the driving pin, under its own weight, rests on the bottom of the recess in the output gear 17 and participates in the rotation of the latter, but no axial knocking movement is taking place.

However, when the drive shaft 12 is in pressure-transmitting engagement with the shutter bolt 52 of an installed dispensing unit 50, the opposing force of the shutter bolt resulting from the second return spring 54 will push the drive shaft 12 upwards, whereby the driving pin 18 is lifted up from the bottom of the recess in the output gear 17 and is urged against, and brought into engagement with, a ring-shaped saw-tooth ramp 19 projecting downwards from the knocker wheel. Due to the different rpm-rates of the output gear 17 and the knocker wheel 24, a short-stroke axial knocking movement of the drive shaft 12 is superimposed on the rotation of the latter as a result of the driving pin 18 sliding along the saw-tooth ramp 19.

In conclusion, the arrangement as explained and illustrated has the result, that when the pressure contact switch 28 is closed, the rotary movement of the drive shaft 12 on the one hand takes place in any state of the dosage-dispensing instrument 1, i.e. from the home position all the way to the fully opened position, but the superimposed axial knocking movement on the other hand is maintained only as long as an axial compressive force is exerted by the drive shaft 12 on the shutter bolt 52 of an installed dispensing unit 50, i.e. when the shutter bolt 52 is positioned in the opening range and dosage material is thus being dispensed out of the discharge opening 58.

Although the invention has been described through the presentation of specific examples, it will be evident to the reader that numerous further variant embodiments could be developed from the teachings of the present invention, for example by combining the features of the individual embodiments with each other or by interchanging individual functional units of the individual embodiments against each other. For example, an embodiment is also conceivable in which the axial knocking movement of the drive shaft is produced for example by electromagnetic, piezoelectric or pneumatic means. It goes without saying that any such variant embodiments are considered to be part of the present invention.

What is claimed is:

1. An instrument for dispensing a powderous or pasteous substance in measured quantities, comprising:
    a dispensing unit, comprising:
        a shutter bolt, mounted for vertical movement;
        a discharge orifice;
        a shutter element; arranged to selectively close the discharge orifice; and
    a control unit, configured as a grip handle and comprising:
        a body being generally elongate with a part that projects laterally therefrom when the instrument is oriented in an operating position, the body having a hollow space therein; and
        a holder device, the holder device configured to removably set and secure the control unit to the dispensing unit through a self-locking latch for operation;
    an actuator, whose action is directed at an installed dispensing unit, the actuator comprising:
        a motor;
        a transmission, at least major portions of the motor and the transmission contained in the hollow space;
        an actuator element; arranged for operation by a user in the laterally-projecting part; and
        a drive shaft, arranged in the laterally-projecting part to be oriented essentially vertically when the instrument is operated with an installed dispensing unit, the motor acting through the transmission to rotate the drive shaft, a first end of the drive shaft facing towards the actuator element and a second end of the drive shaft facing towards the shutter bolt of the installed dispensing unit, such that movement of the actuator element by the user moves the drive shaft axially from a disengaged home position to an engaged position in which the second end mechanically engages the shutter bolt, and, by further movement of the actuator element, the user brings the drive shaft into a range of open positions in which the shutter element opens the discharge orifice to a variable, position-dependent extent.

2. The instrument of claim 1, wherein:
    manual action by the user directed at the actuator element switches the motor from an "off" position to an "on" position in which the drive shaft is rotated.

3. The instrument of claim 2, further comprising:
an actuator unit, supported by the body, in which the motor, the transmission and the drive shaft are arranged, the actuator unit being connected to the actuator element for movement in the vertical direction relative to the operating position of the instrument when manual force is directed at the actuator element.

4. The instrument of claim 1, wherein:
the transmission comprises a spur gear arrangement, wherein the gears have axes of rotation with a substantially vertical orientation relative to the operating position of the instrument.

5. The instrument of claim 3, further comprising:
a first return spring is arranged to resist manual force acting to move the actuator unit from the home position to the engagement position and further into the opening range, the first return spring also arranged to push the actuator unit back towards the home position in response to a decrease of the manual force.

6. The instrument of claim 5, further comprising:
a second return spring is arranged to resist displacement of the shutter bolt by the drive shaft as the drive shaft moves from the engagement position into the opening range, the second return spring braced against the dispensing unit to push the shutter bolt axially upwards against the drive shaft.

7. The instrument of claim 3, further comprising:
a retainer element of the actuator unit; an
a locking element, arranged so that, upon the actuator unit reaching the engagement position, the retainer element snaps into the locking element, blocking a return of the actuator unit towards the home position but permitting continued travel into the opening range.

8. The instrument of claim 7, further comprising:
an unlocking element, arranged on the outside of the body to be operated by a finger of the user, to release the locking element.

9. The instrument of claim 1, wherein:
the shutter bolt is arranged to be set into rotation by the engagement of the drive shaft.

10. The instrument of claim 1, further comprising:
a knocking device, arranged in the actuator unit, to superimpose a short-stroke, axially directed knocking movement on the rotation of the drive shaft and of the shutter bolt, when the shutter bolt is engaged with the drive shaft.

11. The instrument of claim 10, wherein:
an axially directed motion-transmitting connection between the drive shaft and the knocking device generates the axially directed knocking movement of the drive shaft, the connection being established by the axially directed opposing force of the shutter bolt under the biasing tension of the second return spring, so that the axially directed knocking movement of the drive shaft is deactivated in the absence of the opposing force of the shutter bolt.

12. The instrument of claim 1, further comprising:
an identification means, arranged on the dispensing unit to store data; and
a read and write device, arranged in the body for transfer of the data from the identification means.

13. The instrument of claim 1, further comprising:
a nose-like projection, formed at, relative to the operating position, an upper end of a shell of the grip handle shell, such that, in the operating projection, the projection rests on the index finger of the user's hand grasping the body of the control unit, assuring a secure grip thereon.

14. The instrument of claim 1, further comprising:
a power-supply source, arranged for removable placement on the body at a location above the motor, to supply power thereto.

15. A method for dispensing a dosage of a powderous material into a target vessel, comprising the steps of:
providing a dispensing instrument, comprising:
  a dispensing unit, comprising:
    a shutter bolt, mounted for vertical movement;
    a discharge orifice;
    a shutter element; arranged to selectively close the discharge orifice; and
  a control unit, comprising:
    a generally elongate body comprising:
      a grip-handle shell, arranged for receiving a palm of a hand of a user;
      a nose-like projection, arranged for resting on the hand of the user;
      a holder device, the holder device configured to removably receive the dispensing unit for operation;
      a part that projects laterally from the body, above the holder device, when the body is oriented in a generally vertical operating position; and
      a hollow space, inside the body; and
    an actuator, whose action is directed at the dispensing unit in the holder device, the actuator comprising:
      a motor;
      a transmission, with at least major portions of the motor and the transmission contained in the hollow space;
      an actuator element; arranged in the laterally-projecting part for operation by the user holding the control unit; and
      a drive shaft, arranged in the laterally-projecting part to be oriented essentially vertically when the instrument is operated with an installed dispensing unit, the motor acting through the transmission to rotate the drive shaft, a first end of the drive shaft facing towards the actuator element and a second end of the drive shaft facing towards the shutter bolt of the installed dispensing unit, such that movement of the actuator element by the user moves the drive shaft axially from a disengaged home position to an engaged position in which the second end mechanically engages the shutter bolt, and, by further movement of the actuator element, the user brings the drive shaft into a range of open positions in which the shutter element opens the discharge orifice to a variable, position-dependent extent;
assembling the dispensing instrument by setting and securing, with a self-locking latch, the dispensing unit that contains the material into the holder device;
orienting the assembled dispensing instrument vertically over the target vessel, with the discharge orifice facing downwardly;
applying pressure, from the thumb of a user holding the control unit, to the actuator element, closing a contact switch and starting rotary movement of the drive shaft;
moving, through continued and increased thumb pressure on the actuator element, the drive shaft axially into an engagement position where the second end thereof automatically engages, by means of its rotary movement, the shutter bolt of the assembled dispensing instrument, with the full engagement of the drive shaft and shutter bolt locking a latch mechanism that prevents retraction of the drive shaft from the engaged position;

advancing, through continued and further increased thumb pressure on the actuator element, the shutter bolt into the opening range, the shutter bolt now co-rotating with the drive shaft, the rotation and an opposing force from the second return spring effecting a vertical knocking movement that is superimposed on the rotation, the shutter element opening the discharge orifice to a variable degree of aperture that is controlled by the thumb pressure, allowing the material that has been loosened by the rotary and knocking movements to be dispensed through the discharge orifice;

such that when the thumb pressure is reduced on the actuator element, the discharge opening closes, and, when the thumb pressure removed, the motor is switched off while the drive shaft remains in the engaged position; and such that the lock on the engagement position is released by actuating the unlocking element, so that the first return spring pushes the drive shaft and the actuator element back into an unengaged position in which the dispensing unit can be removed from the assembled dispensing instrument.

16. An instrument for manually dispensing a powderous or pasteous substance in measured quantities in a portable manner, comprising:

a dispensing unit, comprising:
  a shutter bolt, mounted for vertical movement;
  a discharge orifice;
  a shutter element; arranged to selectively close the discharge orifice; and a control unit, comprising:
  a generally elongate body comprising:
    a grip-handle shell, arranged for receiving a palm of a hand of a user;
    a nose-like projection, arranged for resting on the hand of the user;
    a holder device, the holder device configured to removably set and secure the control unit to the dispensing unit through a self-locking latch for operation;
    a part that projects laterally from the body, above the holder device, when the body is oriented in a generally vertical operating position; and
    a hollow space, inside the body; and
  an actuator, whose action is directed at the dispensing unit in the holder device, the actuator comprising:
    a motor;
    a transmission, with at least major portions of the motor and the transmission contained in the hollow space;
    an actuator element; arranged in the laterally-projecting part for operation by the user holding the control unit; and a drive shaft, arranged in the laterally-projecting part to be oriented essentially vertically when the instrument is operated with an installed dispensing unit, the motor acting through the transmission to rotate the drive shaft, a first end of the drive shaft facing towards the actuator element and a second end of the drive shaft facing towards the shutter bolt of the installed dispensing unit, such that movement of the actuator element by the user moves the drive shaft axially from a disengaged home position to an engaged position in which the second end mechanically engages the shutter bolt, and, by further movement of the actuator element, the user brings the drive shaft into a range of open positions in which the shutter element opens the discharge orifice to a variable, position-dependent extent.

* * * * *